United States Patent
Gao et al.

(10) Patent No.: US 12,301,837 B2
(45) Date of Patent: May 13, 2025

(54) REGION OF INTEREST CODING FOR VCM

(71) Applicant: TENCENT AMERICA LLC, Palo Alto, CA (US)

(72) Inventors: Wen Gao, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 50 days.

(21) Appl. No.: 18/477,189

(22) Filed: Sep. 28, 2023

(65) Prior Publication Data

US 2024/0121408 A1    Apr. 11, 2024

Related U.S. Application Data

(60) Provisional application No. 63/412,367, filed on Sep. 30, 2022.

(51) Int. Cl.
*G06V 10/25* (2022.01)
*H04N 19/159* (2014.01)
*H04N 19/167* (2014.01)

(52) U.S. Cl.
CPC ........... *H04N 19/167* (2014.11); *G06V 10/25* (2022.01); *H04N 19/159* (2014.11)

(58) Field of Classification Search
CPC ..................................................... G06V 10/25
See application file for complete search history.

(56) References Cited

U.S. PATENT DOCUMENTS

2011/0051808 A1  3/2011  Quast et al.
2019/0172247 A1  6/2019  Grossman et al.

FOREIGN PATENT DOCUMENTS

WO    2021/211884 A1    10/2021

OTHER PUBLICATIONS

M. Rafie, et al., "Evaluation Framework for Video Coding for Machines", ISO/IEC JTC 1/SC 29/WG 2 N19, Oct. 2020, pp. 1-50.
Zhou Wang, et al., "Multi-Scale Structural Similarity for Image Quality Assessment", Published in: Proceedings of the 37th IEEE Asilomar Conference on Signals, Sstems and Computers, Pacific Grove, CA, Nov. 9-12, 2003, pp. 1-5.
M. Rafie (GTI, et al., "Call for Evidence for Video Coding for Machines", ISO/IEC JTC 1/SC 29/WG2 N20, pp. 1-12.
Yuan Zhang, et al., "Use cases and requirements for Video Coding for Machines", ISO/IEC JTC 1/SC 29/WG2 N18, pp. 1-19.
International Search Report dated Jan. 31, 2024 in Application No. PCT/US2023/34153.
Written Opinion of the International Searching Authority dated Jan. 31, 2024 in Application No. PCT/US2023/34153.

*Primary Examiner* — Y Lee
(74) *Attorney, Agent, or Firm* — Sughrue Mion, PLLC (57) ABSTRACT

A technique for encoding video for machine vision and human/machine hybrid vision, including receiving image data. The technique may also include detecting a plurality of bounding boxes associated with a plurality of objects of interest in a frame of the image data and detecting a frame-level bounding box for the frame based on coordinates of the plurality of bounding boxes. Then, the technique may include encoding the frame-level bounding box using a first bitrate.

14 Claims, 7 Drawing Sheets

REGION OF INTEREST CODING FOR VCM

CROSS REFERENCE TO RELATED APPLICATIONS

This application claims priority from U.S. Provisional Application No. 63/412,367, filed on Sep. 30, 2022, in the U.S. Patent & Trademark Office, the disclosure of which is incorporated herein by reference in its entirety.

TECHNICAL FIELD

The present disclosure relates to video coding for machine vision. Specifically, approaches to encoding video for machine vision and human/machine hybrid vision are disclosed.

BACKGROUND

Traditionally, video or images are consumed by a human being for a variety of usages such as entertainment, education, etc. Thus, video coding or image coding often utilize characteristics of the human visual system for better compression efficiency, while maintaining good subjective quality.

In recent years, with the rise of machine learning applications, along with the abundance of sensors, many intelligent platforms have utilized video for machine vision tasks such as object detection, segmentation or tracking. How to encode video or images for consumption by machine tasks becomes an interesting and challenging problem, leading to the introduction of Video Coding for Machines (VCM) studies. To achieve this goal, the international standard group MPEG created an Ad-Hoc group, "Video coding for machine (VCM)" to standardize the related techniques for better interoperability among difference devices.

Existing video codecs are mainly for human consumption. However, more and more video is consumed by machine for machine vision tasks such as object detection, instance segmentation, object tracking, etc. It is important to develop a video codec that efficiently encodes video for machine vision or hybrid machine/human vision.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums on encoding video for machine vision and human/machine hybrid vision.

A method for encoding video for machine vision and human/machine hybrid vision may be provided. The method may be executed by one or more processors, and may include receiving image data; detecting a plurality of bounding boxes associated with a plurality of objects of interest in a frame of the image data; detecting a frame-level bounding box for the frame based on coordinates of the plurality of bounding boxes; and encoding the frame-level bounding box using a first bitrate.

An apparatus for encoding video for machine vision and human/machine hybrid vision may be provided. The apparatus may include at least one memory configured to store program code; and at least one processor configured to access the program code. The at least one processor may be configured to operate as instructed by the program code, the program code including: first receiving code configured to cause the at least one processor to receive image data; first detecting code configured to cause the at least one processor to detect a plurality of bounding boxes associated with a plurality of objects of interest in a frame of the image data; second detecting code configured to cause the at least one processor to detect a frame-level bounding box for the frame based on coordinates of the plurality of bounding boxes; and first encoding code configured to cause the at least one processor to encode the frame-level bounding box using a first bitrate.

A non-transitory computer readable medium having stored thereon computer instructions that when executed by at least one processor for encoding video for machine vision and human/machine hybrid vision may be provided that causes the at least one processor to receive image data; detect a plurality of bounding boxes associated with a plurality of objects of interest in a frame of the image data; detect a frame-level bounding box for the frame based on coordinates of the plurality of bounding boxes; and encode the frame-level bounding box using a first bitrate.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of some embodiments some embodiments may be incorporated into or combined with some embodiments (or one or more features of some embodiments). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "some embodiments," "an embodiment," or similar language means that a particular feature, structure, or characteristic described in connection with the indicated embodiment is included in some embodiments of the present solution. Thus, the phrases "in some embodiments", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

The disclosed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Embodiments of the present disclosure are directed to a video coding for machine. Specifically, methods of encoding video for machine vision and human/machine hybrid vision are disclosed. Traditional video codecs are designed for human consumption. In some embodiments, a traditional video codec may be combined with a learning-based codec to form a hybrid codec such that the video may be coded efficiently for machine vision and hybrid human-and-machine vision.

Figure 1:
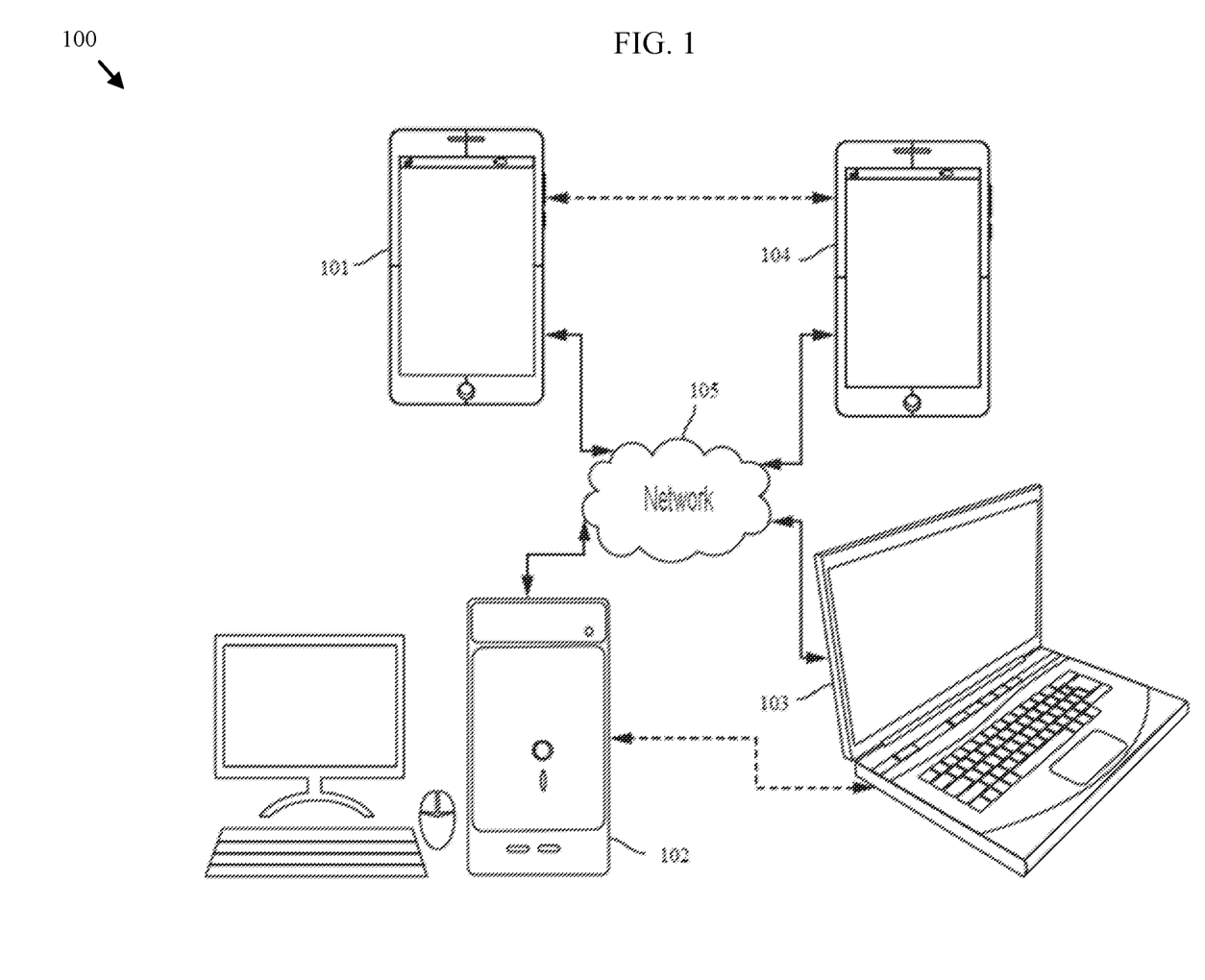
FIG. 1 is a diagram of an example network device, in accordance with various embodiments of the present disclosure.

FIG. 1 is a diagram of an example device for performing translation services. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar operating device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the operations described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given operation.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more operations described as being performed by another set of components shown in FIG. 1.

Figure 2:
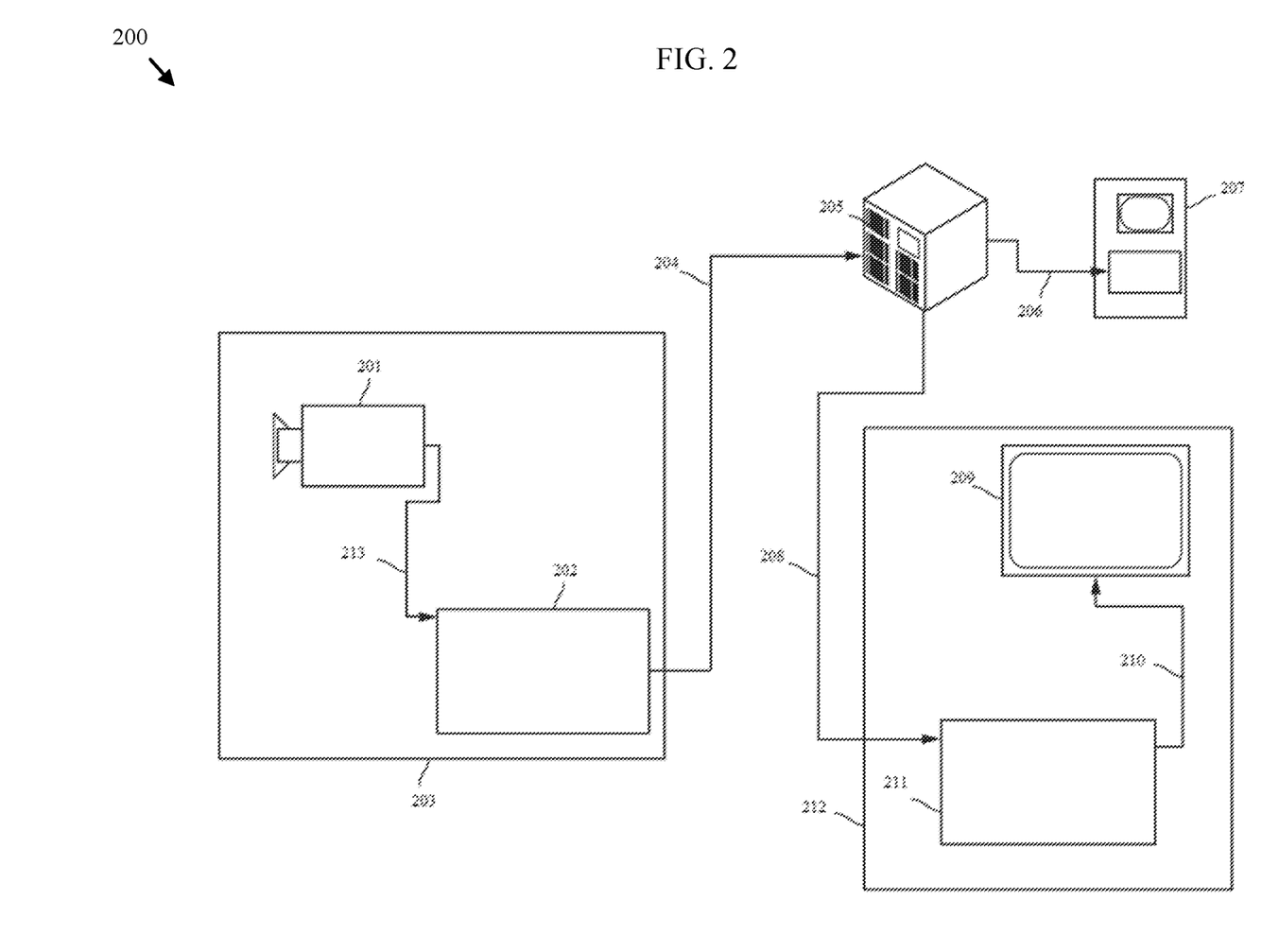
FIG. 2 shows the architecture of the disclosed hybrid video codec, according to an embodiment of the present disclosure.

FIG. 2 is block diagram of a view of an embodiment of the hybrid video codec 200. The hybrid video code 200 may include a traditional codec 220 and learning-based codec 230. The input 201 to the hybrid codec may be videos or images since images may be treated as a special type of video (e.g., a video with one image). In FIG. 2, a traditional video codec 220 may be used to compress an input video 201 of different scales (e.g., original resolution or down-sampled), the down-sampling ratio of down-sampling module 210 may be fixed and known in both the encoder 221 and the decoder 223, or the down-sampling ratio may be user-defined, for example, 100% (e.g., no down-sampling is performed), 50%, 25%, etc., and sent as meta data in the bitstreams 224 to inform the decoder 222. The traditional video codec may be VVC, HEVC, H264 or image codec such as JPEG, JPEG2000. The down-sampling module 210 may be a classical image down-sampler or a learning-based image down-sampler. The decoded down-sampled video 203 (e.g., "low-res video 203" in FIG. 2) may be up-sampled using up-sampling module 250 to the video's original resolution (e.g., "high-res video 204"), which may be used for human vision. The up-sampling module 250 may be a classical image up-sampler or learning-based image up-sampler such as a learning-based super-resolution module.

In some embodiments, the hybrid video codec 200 may also employ a learning-based video codec 230 to compress the down-sampled video 202.

In the encoder, the reconstructed video 203 may also be generated and up-sampled to the original input resolution. The up-sampled reconstructed video 205 may then be subtracted from the input video to generate residual video signals 202, which may be fed into the learning-based codec 230 of FIG. 2. The up-sampling module 240 of hybrid video codec 200 may be the same as Up-Sampling Module 250

(after low-res). Video 203 may be decoded at the decoder. The output of the residual decoder 238 may be added on top of the high-res video 204 to form the reconstructed video 205, which may be used for machine vision tasks.

Figure 3:
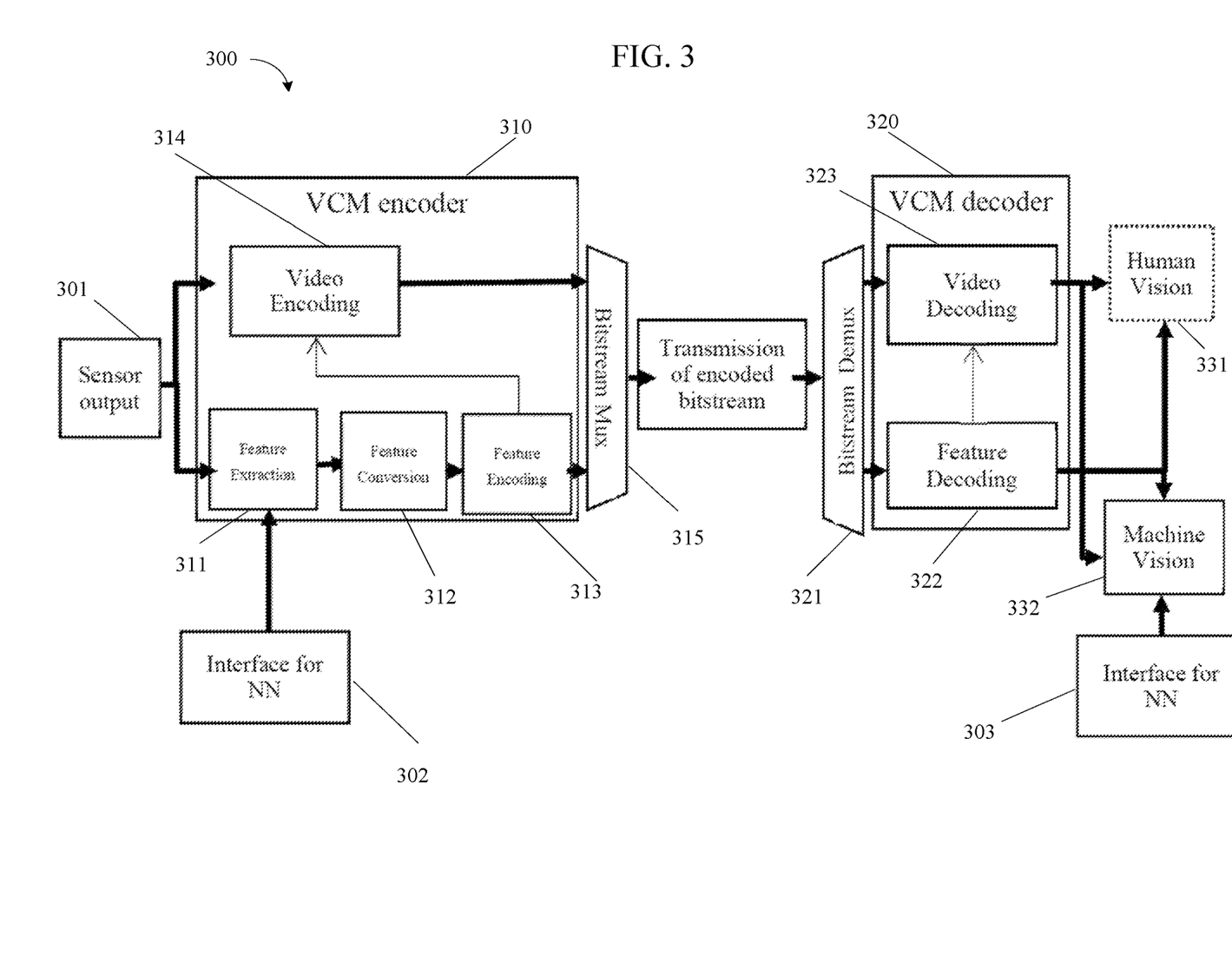
FIG. 3 is a video coding for machine system, in accordance with various embodiments of the present disclosure.

FIG. 3 illustrates embodiment of an architecture for a Video Coding Machine (VCM) such as hybrid video codec 200. Sensor output 300 follows a video encoding path 311 through VCM encoder 310 to VCM decoder 320 where it undergoes video decoding 321. Another path is for feature extraction 312, to feature conversion 313, to feature encoding 314 and feature decoding 322. The output of VCM decoder 320 is mainly for machine consumption, i.e. machine vision 305. In some cases, it can also be used for human vision 306. Then one or more machine tasks to understand the video content will be performed.

As is known, video contents often contain a lot of information, for example, moving objects in the front and static scenes in the background. Classic video codec often explores the temporal or special redundancy to compress the contents. In video coding for machines, the machine vision tasks are often object detection, instance segmentation, or object tracking etc. In these types of tasks, the objects, such as persons, cars, bicycles, etc. are of main interests while other information such as trees, grass, sky, etc. are of little interest. It would be beneficial to explore these kinds of observations to further reduce the information that need to be transmitted or stored. Hence, we disclose region of interest coding in this application.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In this disclosure, picture, image and frame are interchangeable.

According to embodiments, two types of ROI methods are discussed, e.g., the spatial region of interest (ROI) and temporal ROI.

Spatial Region of Interest Coding for Image Coding

Figure 4A:
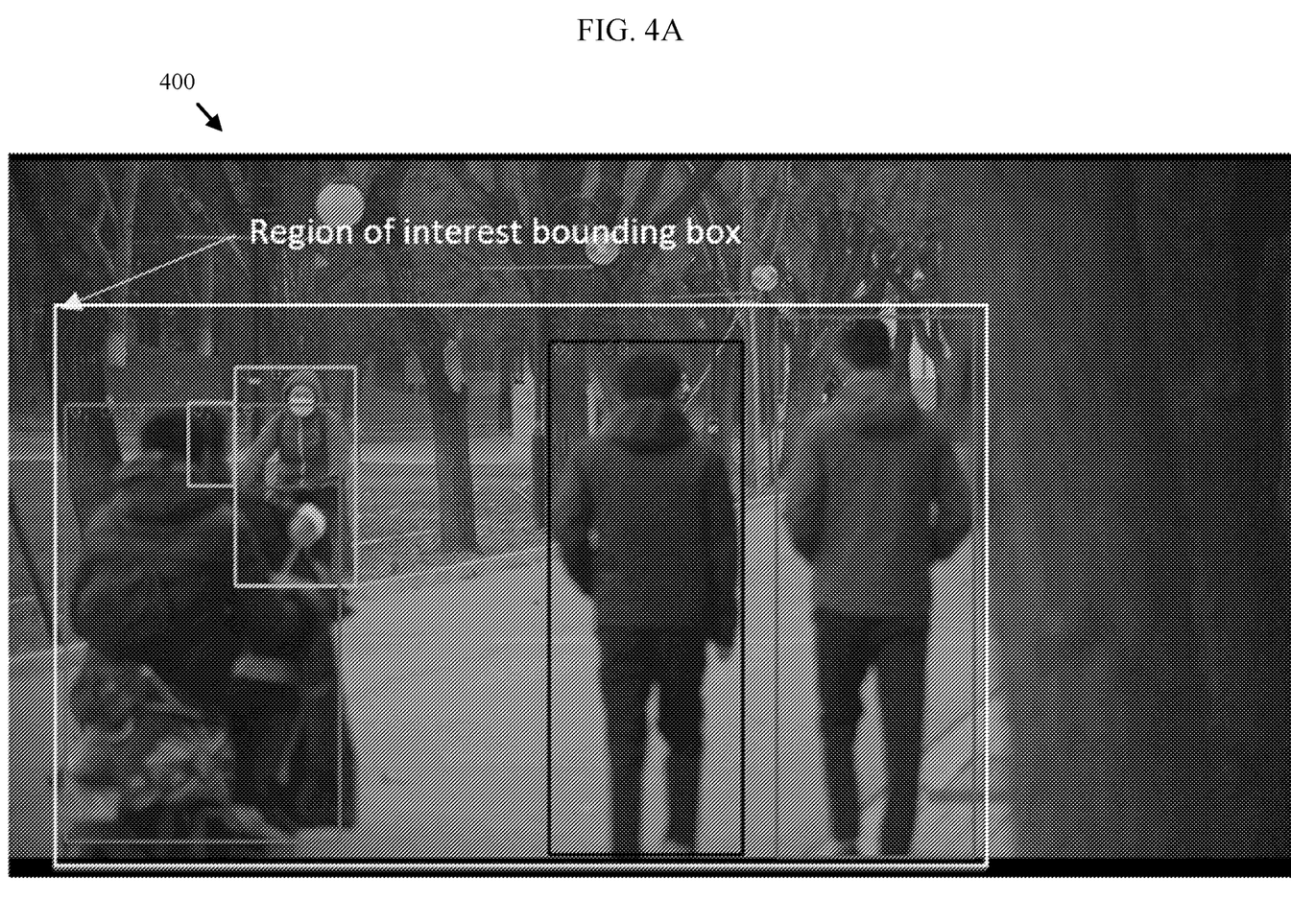
FIG. 4A is a diagram of a spatial region of interest bounding box, in accordance with various embodiments of the present disclosure.

According to an embodiment, at the encoder side, an object detector may be used to detect bounding boxes of all interested objects in a frame/image (image or frame may be used interchangeably in the present disclosure), and then a region of interest bounding box may be computed so that it contains all the bounding boxes of the interested objects. FIG. 4A is an exemplary illustration of a region of interest bounding box determined for a frame 400 that encapsulates a plurality of objects of interest.

As shown in FIG. 4A, pedestrians and persons riding bicycles or motorcycles are marked with bounding box of relative dark box. The outer white box is the ROI bounding box, which contains all the bounding boxes of the persons in the scene.

According to an embodiment, for frames, assume the bounding boxes of all interested objects are denoted as $\{x_1^{(k)}, y_1^{(k)}, x_2^{(k)}, y_2^{(k)}\}$ for k=0, N where N is the number of interested objects in the scene, and $(x_1^{(k)}, y_1^{(k)})$ are the x, y coordinates of the top left corner of the bounding box of the k-th object while $(x_2^{(k)}, y_2^{(k)})$ are the x, y coordinates of the bottom right corner of the bounding box of the k-th object. The coordinate of the ROI bounding box can be computed as following:

$$x_1^{(ROI)} = \max\left(\min_k(x_1^{(k)}) - m_x^{(1)}, 0\right) \quad \text{Eqn (1)}$$

$$y_1^{(ROI)} = \max\left(\min_k(y_1^{(k)}) - m_y^{(1)}, 0\right) \quad \text{Eqn (2)}$$

$$x_2^{(ROI)} = \min\left(\max_k(x_2^{(k)}) + m_x^{(2)}, W - 1\right) \quad \text{Eqn (3)}$$

$$y_2^{(ROI)} = \min\left(\max_k(y_2^{(k)}) + m_y^{(2)}, H - 1\right) \quad \text{Eqn (4)}$$

Where $(x_1^{ROI}, y_1^{(ROI)})$ and $(x_2^{(ROI)}, y_2^{ROI})$ are top left coordinates and bottom right coordinates of the ROI bounding box, $m_x^{(1)}, m_y^{(1)}, m_x^{(2)}, m_y^{(2)}$ are the margins that can be used to expand the ROI bounding box, W and H are width and height of the frame, respectively. Depending on the confidence of the object detector or the use case, an encoder can choose different margin parameters, for example, $m_x^{(1)}=m_y^{(1)}=m_x^{(2)}=m_y^{(2)}=16$.

Figure 4B:
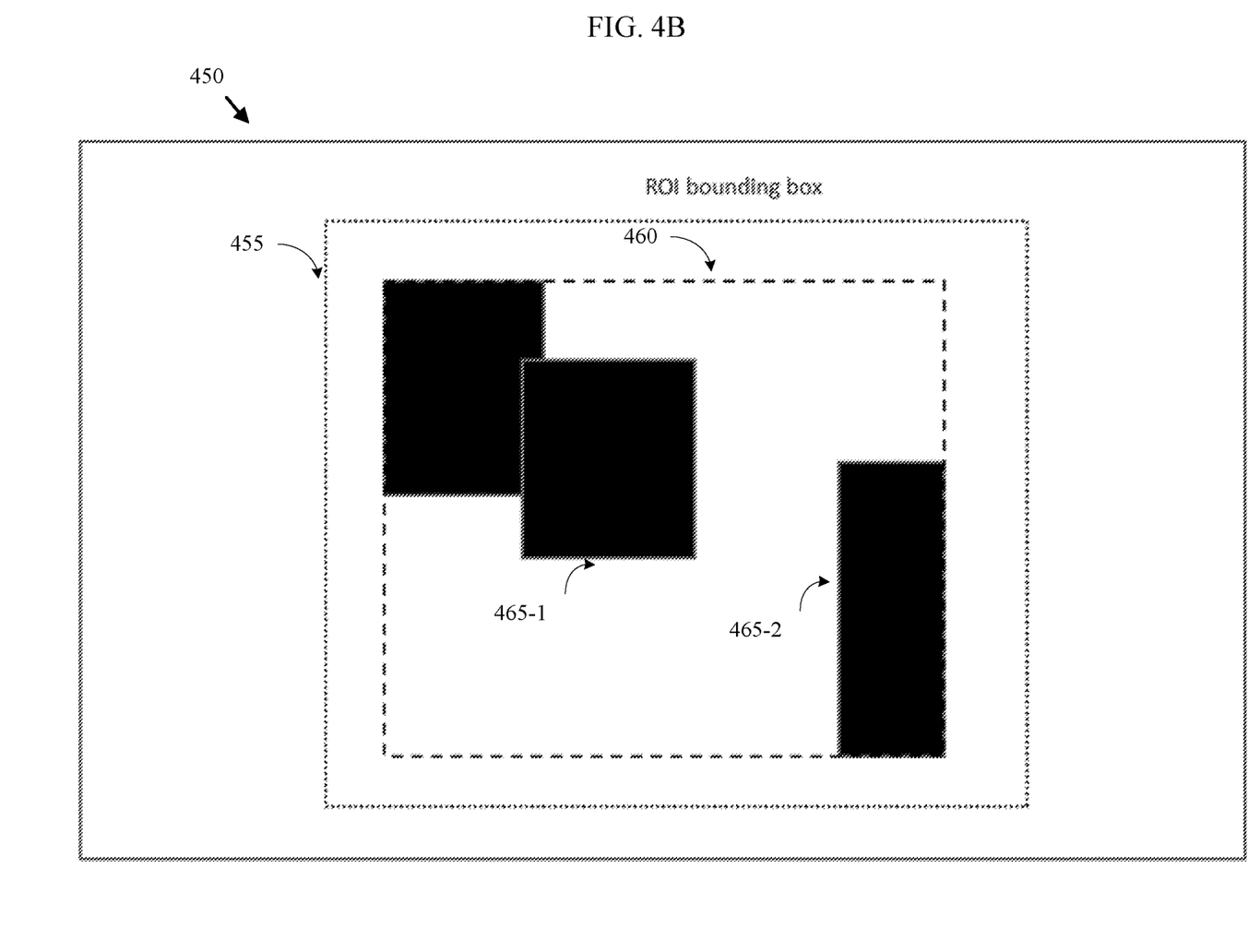
FIG. 4B is a diagram illustrating a region of interest bounding box computation, in accordance with various embodiments of the present disclosure.

The computation of the ROI bounding box is illustrated in FIG. 4B. As shown in FIG. 4B, black boxes denotes interested objects (e.g., 465-1, 465-2), the dotted box 460 denoted the box that exactly contain the interested objects. The dashed box 455 is the ROI bounding with margin added.

According to an embodiment, after the computation of the ROI bounding box (e.g., 455), to reduce the bitrate for transmission or storage, only the contents within the ROI bounding box may be encoded to obtain bitstream of an image. For example, a first higher bitrate may be used to encode only the contents within the ROI box.

In a same or another embodiment, the frame without the ROI bounding box may be encoded using low bitrate configuration, such as high quantization step size or reduced scale, in case those contents may be of interest in the future. As an example, for coding of just the frame without the ROI bounding box, the ROI region may be filled with a constant value, such as 0 or 128, etc.

In a same or other embodiment, the whole frame may be encoded using low bitrate configuration, such as high quantization step size or reduced scale.

According to an embodiment, at the decoder side, picture or frame that contains the ROI bounding box may be decoded and may be used standalone, or it may be put together with the frame without ROI part to form the final picture frame. In some embodiments, padding methods may be used to extend the boundary of the picture or frame to extend to the same size of the original picture (with regions outside ROI bounding box). In embodiments where the original size pictures need to be recovered, the original size, the ROI bounding may be sent as metadata in the bitstreams.

Therefore, as an exemplary embodiment, methods for spatial ROI as disclosed herein may include receiving image data comprising a plurality of frames from sensors. Then, for a frame in the image data, a plurality of bounding boxes associated with a plurality of objects of interest in the frame may be detected. A frame-level bounding box for the frame may be detected based on coordinates of the plurality of bounding boxes. The frame-level bounding box may be encoded using a first bitrate. In embodiments, a section of the frame that is not included in the frame-level bounding box may be encoded using a second bitrate, wherein the second bitrate is lower than the first bitrate. In embodiments, in response to encoding the frame-level bounding box using the first bitrate, the frame, or at least the rest of the frame, may be encoded using a second bitrate. In some embodiments, a section of the frame included in the frame-level bounding box may be filled in using a constant value prior to encoding the frame using the second bitrate.

Spatial Region of Interest Coding for Video Coding

In embodiments, frames that already coded may be used as reference to predict the current frame. In such an embodiment, the ROI bounding box information for each frame may be carried as meta data in the bitstream so that a decoder can put the decoded ROI contents into the right position of the original image to facilitate motion compensation.

According to an embodiment, a video sequence may be split into multiple intra periods. As an example, an intra period may be around 1 or 2 seconds apart, which may correspond to 32 frames or 64 frames for a video with frame rate as 30 frame/second. According to an embodiment, for one intra period, ROI bounding boxes for all frames may be computed. A common ROI bounding box size that includes all the individual ROI bounding boxes with certain margin may be computed.

Therefore, according to an embodiment methods disclosed herein may include, for an intra-period comprising a plurality of temporally sequential frames, a common intra-period level bounding box may be determined based on a plurality of frame-level bounding boxes for the plurality of temporally sequential frames in the intra-period. The method may also include signaling, as metadata in a bitstream, top-left coordinates and bottom right coordinates of the common intra-period level bounding box. In some embodiments, the intra-period may include a predetermined number of temporally sequential frames.

As stated above, some information associated with frames may be signaled as metadata. As an example, an original size of the frame and a size of the frame-level bounding box may be signaled as metadata. When signaling the size of the frame-level bounding box, a top-left coordinate and a bottom-right coordinate of the frame-level bounding box may be signaled.

Figure 5:
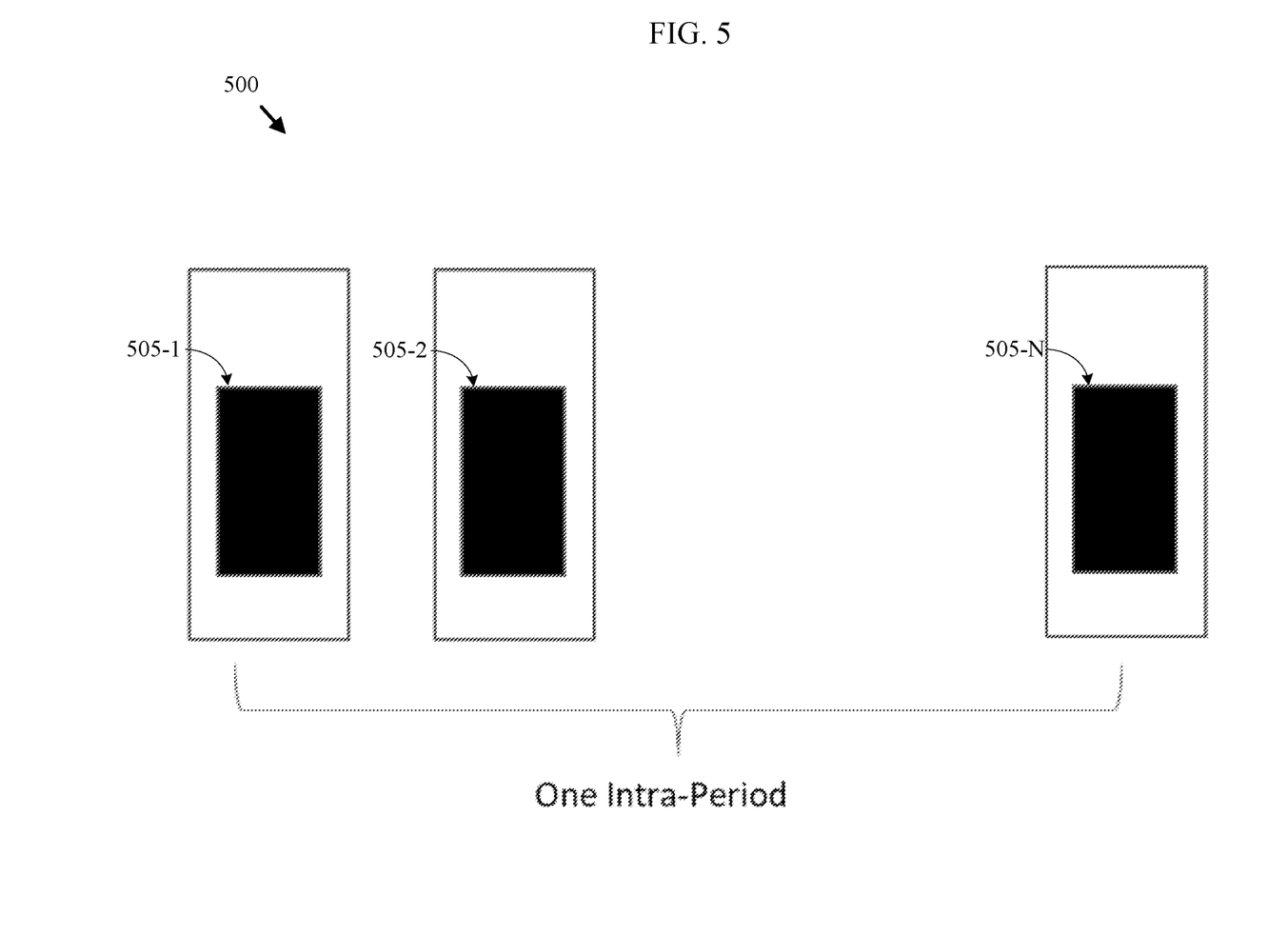
FIG. 5 is a diagram illustrating a region of interest bounding box computation for n intra-period, in accordance with various embodiments of the present disclosure.

FIG. 5 illustrates a common ROI bounding box, i.e., the black box (505-1, 505-1, ... 505-N), for an intra period. Due to the usage of a common ROI bounding box for an intra period, only the common bounding box information, i.e., its top left and bottom right coordinates, are sent in the bitstream as metadata.

According to an embodiment, only the contents within the common ROI bounding for each frame are sent in the bitstream or as the metadata, for each intra period, or for a specific number of frames. In such an embodiment, regular motion prediction/compensation can be done since all the frames in the intra period have the same resolution. Therefore, in embodiments, the frame of the image data that is being analyzed for ROI may be selected based on a predetermined sample rate or may be selected from one of every predetermined number of frames of the image data. In embodiments, the predetermined number of frames varies based on a complexity of a scene. In embodiments, some additional information associated with the frame, such as the predetermined sample rate or the predetermined number of frames may be signaled in a bitstream as metadata.

In a same or another embodiment, the original frames without the content in the ROI region may also coded and sent with low bitrate configuration, i.e., large quantization step or lower scale, etc. In embodiments, the ROI region may be filled with a constant value, such as 0 or 128, etc.

In a same or another embodiment, the original frames may also coded and sent with low bitrate configuration, i.e., large quantization step or lower scale, etc.

According to an embodiment, at the decoder, the picture or the frame that contains the ROI bounding box may be decoded and may be used standalone, or it can be put together with the frame without ROI part to form the final picture. In embodiments, padding methods may be used to extend the boundary of the picture to extend to the same size of the original picture (with regions outside ROI bounding box). In embodiments where video recovery is required with the original resolution, the original video resolution may be sent as the metadata.

Temporal Region of Interest Coding for Video Coding

As is known, consecutive video frames may share a lot of common information. For example, consecutive frames may contain the same objects with slightly different position or shape. This observation may be utilized in video coding for machines to reduce the transmission rate or storage. An encoder may utilize an analysis module to determine the motion characteristic of a video segment.

In a same or another embodiment, video frames may be temporally down-sampled, i.e., only one frame in every N frame may be chosen for encoding and transmission/storage. N may be set as a fix value, or it may be a variable. For example, N may be small, e.g., 2, for dynamic scene or relatively large, e.g., 4 or 8, for relatively static contents.

In a same or another embodiment, instead of evenly sub-sample the video in the temporal domain, part of video may be selected for coding and transmission/storage if action or event occurred in a specific part. Parts of contents may be ignored without coding since when is no action/event in a specific part. The rest of content can be sampled evenly.

In a same or other embodiment, the video frames are sampled unevenly. For example, for first 12 frames, we choose, frame number 0, 3, 7, 8, 11 for encoding.

To inform the timing information of the coded content, metadata such as sample rate N may be sent in the bitstream. If a part of video uses the same sample rate N, it is only sent at the beginning of the bitstream for the said part. For unevenly sample video, metadata such as frame number or time stamp may be sent in the bitstream.

In situations where the video frame with original frame rate needs to be recovered, duplicated pictures may be inserted into the decoded video. For example, if only frames with frame number 0, 3, 7, 8, and 1 are sent, and they may be denoted f0, f3, f7, f8, and f11 respectively. The decoder may then duplicate the frames as following to obtain 12 frames, such as for example: f0, f0, f0, f3, f3, f3, f3, f7, f8, f8, f8, f11.

In embodiments, to further reduce the bitrate for transmission or storage, embodiments may combine spatial ROI methods and temporal ROI methods as disclosed herein in video coding for machines.

Figure 6:
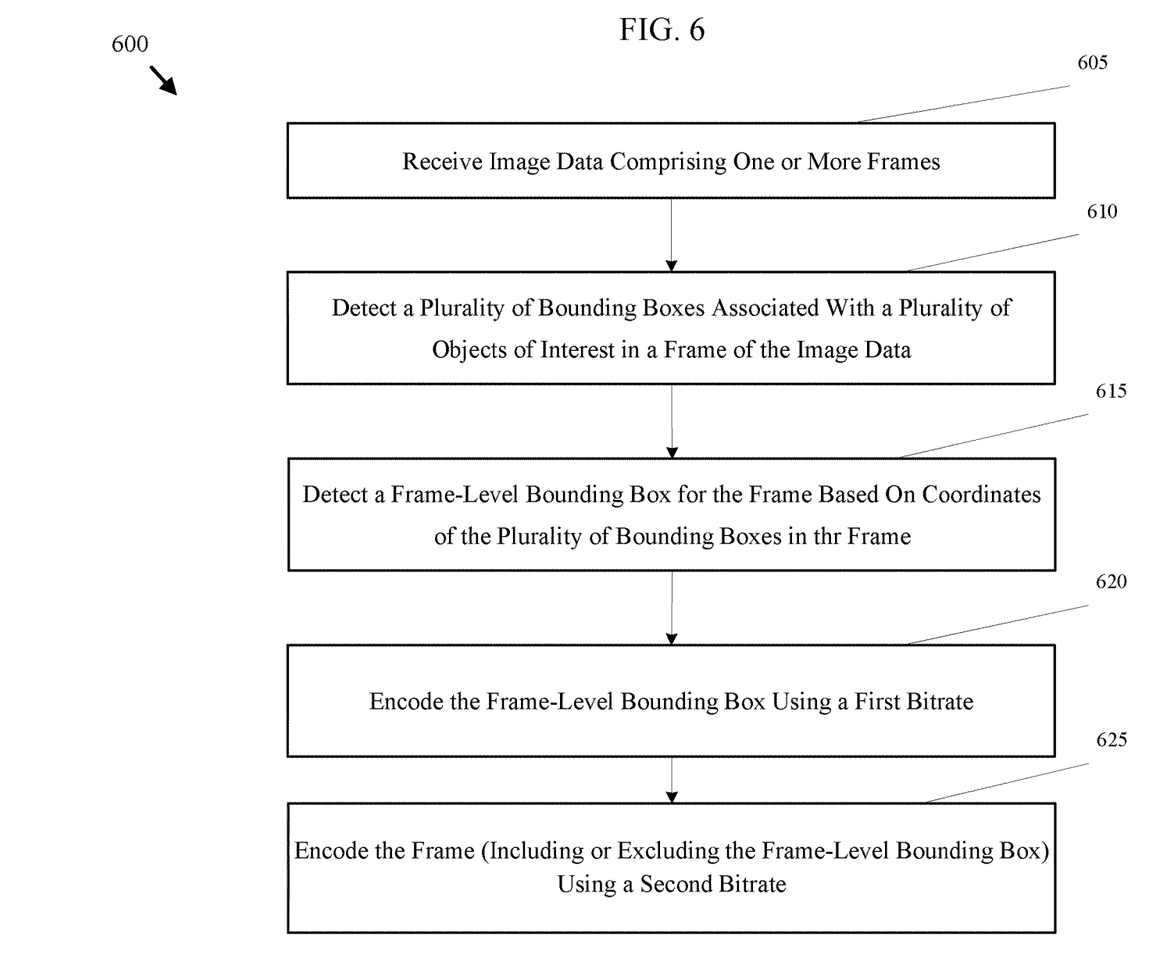
FIG. 6 is a flow chart of an example process for determining a region of interest in a hybrid video codec, in accordance with various embodiments of the present disclosure.

FIG. 6 illustrates a process 600 for encoding video for machine vision and human/machine hybrid vision according to an embodiment.

As shown in FIG. 6, at operation 605, image data may be received. In embodiments, image data may be received over a network or may be received from a sensor.

At operation 610, a plurality of bounding boxes associated with a plurality of objects of interest may be determined in a frame of the image data.

In embodiments, the frame may be selected based on a predetermined sample rate or selected from one of every predetermined number of frames of the image data. In embodiments, the predetermined number of frames may vary based on a complexity of a scene.

At operation 615, a frame-level bounding box for the frame based on coordinates of the plurality of bounding boxes may be detected.

At operation 620, the frame-level bounding box may be encoded using a first bitrate.

At operation 625, a section of the frame not included in the frame-level bounding box may be encoded using a second bitrate. In embodiments, the second bitrate may be lower than the first bitrate. In embodiments, in response to encoding the frame-level bounding box using the first bitrate and/or the frame using a second bitrate, a section of the frame included in the frame-level bounding box may be filled in using a constant value prior to encoding the frame using the second bitrate.

In embodiments, for an intra-period comprising a plurality of temporally sequential frames, a common intra-period level bounding box may be determined based on a plurality of frame-level bounding boxes for the plurality of temporally sequential frames in the intra-period; and the top-left coordinates and bottom right coordinates of the common intra-period level bounding box may be signaled in the bitstream as metadata. An the intra-period is made up of a predetermined number of temporally sequential frames.

Other metadata that may be signaled in the bitstream may include original size of the frame, a size of the frame-level bounding box, a top-left coordinate and a bottom-right coordinate of the frame-level bounding box, the predetermined sample rate or the predetermined number of frames.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations in the blocks may occur out of the order in the Figures. For example, two blocks shown in succession may, in fact, be executed concurrently or substantially concurrently, or the blocks may sometimes be executed in the reverse order, depending upon the functionality involved Each block of the block diagrams and/or flowchart illustration, and combinations of blocks in the block diagrams and/or flowchart illustration, may be implemented by special purpose hardware-based systems that perform the specified operations or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for encoding video for machine vision and human/machine hybrid vision, the method being executed by one or more processors, the method comprising:
    receiving image data;
    detecting a plurality of bounding boxes associated with a plurality of objects of interest in a frame of the image data;
    detecting a frame-level bounding box for the frame based on coordinates of the plurality of bounding boxes;
    encoding the frame-level bounding box using a first bitrate;
    for an intra-period comprising a plurality of temporally sequential frames, determine a common intra-period level bounding box based on a plurality of frame-level bounding boxes for the plurality of temporally sequential frames in the intra-period, wherein the frame of the image data is selected based on a predetermined sample rate or selected from one of every predetermined number of frames of the image data, and wherein the predetermined number of frames varies based on a complexity of a scene; and
    signaling, as metadata in a bitstream, top-left coordinates and bottom right coordinates of the common intra-period level bounding box.

2. The method of claim 1, wherein the intra-period comprises a predetermined number of temporally sequential frames.

3. The method of claim 1, wherein the method further comprises:
    signaling, as metadata in a bitstream, an original size of the frame and a size of the frame-level bounding box.

4. The method of claim 3, wherein signaling the size of the frame-level bounding box comprises signaling a top-left coordinate and a bottom-right coordinate of the frame-level bounding box.

5. The method of claim 1, wherein the method further comprises:
    encoding a section of the frame not included in the frame-level bounding box using a second bitrate,
    wherein the second bitrate is lower than the first bitrate.

6. The method of claim 1, wherein the method further comprises:
    in response to encoding the frame-level bounding box using the first bitrate, encoding the frame using a second bitrate,
    wherein a section of the frame included in the frame-level bounding box is filled in using a constant value prior to encoding the frame using the second bitrate.

7. The method of claim 1, wherein the method further comprises:
    encoding the frame using a second bitrate, wherein the second bitrate is lower than the first bitrate.

8. The method of claim 1, wherein the method further comprises:
    signaling, as metadata in a bitstream, the predetermined sample rate or the predetermined number of frames.

9. An apparatus for encoding video for machine vision and human/machine hybrid vision, the apparatus comprising:
    at least one memory configured to store program code; and
    at least one processor configured to access the program code and operate as instructed by the program code, the program code including:
        first receiving code configured to cause the at least one processor to receive image data;
        first detecting code configured to cause the at least one processor to detect a plurality of bounding boxes associated with a plurality of objects of interest in a frame of the image data;
        second detecting code configured to cause the at least one processor to detect a frame-level bounding box for the frame based on coordinates of the plurality of bounding boxes;
        first encoding code configured to cause the at least one processor to encode the frame-level bounding box using a first bitrate;
        first determining code configured to cause the at least one processor to determine, for an intra-period comprising a plurality of temporally sequential frames, a common intra-period level bounding box based on a plurality of frame-level bounding boxes for the plurality of temporally sequential frames in the intra-period, wherein the frame of the image data is selected based on a predetermined sample rate or selected from one of every predetermined number of frames of the image data, and wherein the predetermined number of frames varies based on a complexity of a scene; and first signaling code configured to cause the at least one processor to signal, as metadata in a bitstream, top-left coordinates and bottom right coordinates of the common intra-period level bounding box.

10. The apparatus of claim 9, wherein the program code further comprises:

second signaling code configured to cause the at least one processor to signal, as metadata in a bitstream, an original size of the frame and a size of the frame-level bounding box.

11. The apparatus of claim 9, wherein the program code further comprises:

second encoding code configured to cause the at least one processor to encode a section of the frame not included in the frame-level bounding box using a second bitrate, wherein the second bitrate is lower than the first bitrate.

12. The apparatus of claim 9, wherein the program code further comprises:

third encoding code configured to cause the at least one processor to encode, in response to encoding the frame-level bounding box using the first bitrate, the frame using a second bitrate, wherein a section of the frame included in the frame-level bounding box is filled in using a constant value prior to encoding the frame using the second bitrate.

13. A non-transitory computer readable medium having stored thereon computer instructions that when executed by at least one processor for encoding video for machine vision and human/machine hybrid vision causes the at least one processor to:

receive image data;

detect a plurality of bounding boxes associated with a plurality of objects of interest in a frame of the image data;

detect a frame-level bounding box for the frame based on coordinates of the plurality of bounding boxes;

encode the frame-level bounding box using a first bitrate;

for an intra-period comprising a plurality of temporally sequential frames, determine a common intra-period level bounding box based on a plurality of frame-level bounding boxes for the plurality of temporally sequential frames in the intra-period, wherein the frame of the image data is selected based on a predetermined sample rate or selected from one of every predetermined number of frames of the image data, and wherein the predetermined number of frames varies based on a complexity of a scene; and signaling, as metadata in a bitstream, top-left coordinates and bottom right coordinates of the common intra-period level bounding box.

14. The non-transitory computer readable medium of claim 13, wherein the at least one processor to is further cause to:

signal, as metadata in a bitstream, an original size of the frame and a size of the frame-level bounding box.

* * * * *